Feb. 22, 1966 L. CHADENSON ETAL 3,236,193
TRACK SUPPORT FOR SUSPENSION RAILWAYS
Filed Jan. 20, 1964 5 Sheets-Sheet 1
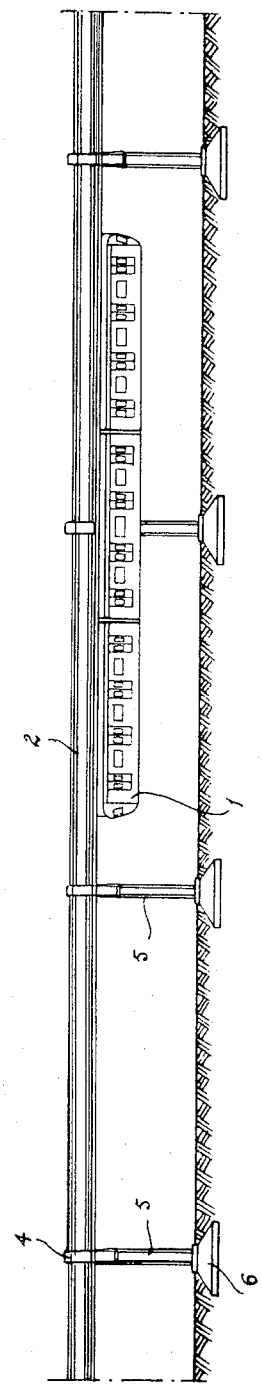
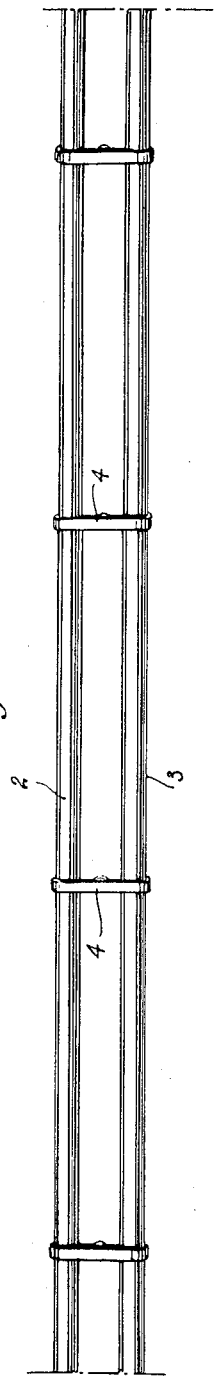

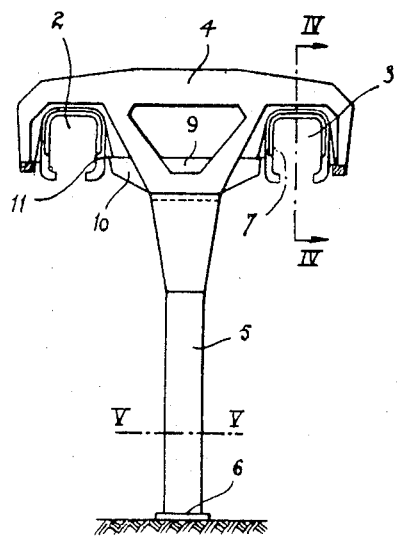
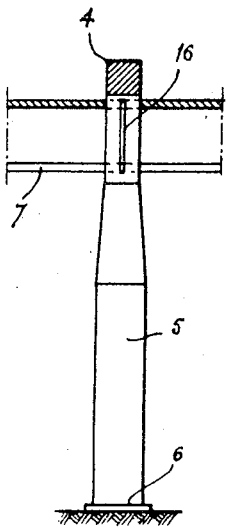
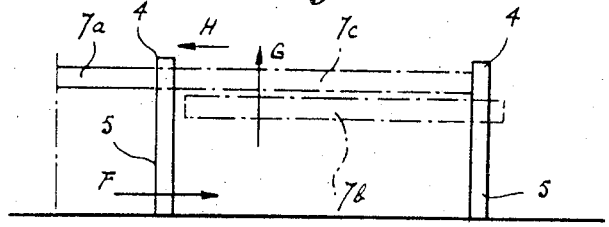

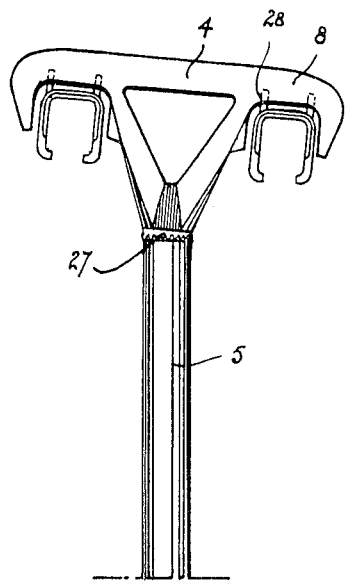
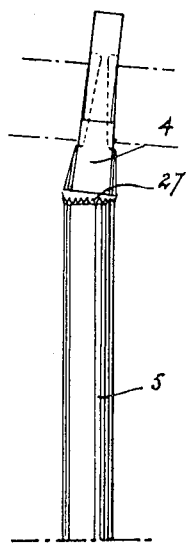
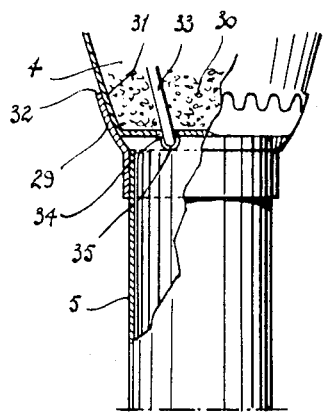

Feb. 22, 1966 L. CHADENSON ETAL 3,236,193
TRACK SUPPORT FOR SUSPENSION RAILWAYS
Filed Jan. 20, 1964 5 Sheets-Sheet 5

United States Patent Office 3,236,193
Patented Feb. 22, 1966

3,236,193
TRACK SUPPORT FOR SUSPENSION RAILWAYS
Lucien Chadenson and Nicolas Esquillan, Paris, France, assignors, by mesne assignments, to Safege-Transport, Societe Anonyme, Paris, France
Filed Jan. 20, 1964, Ser. No. 338,693
Claims priority, application France, Jan. 23, 1963, 922,346, Patent 1,354,234
12 Claims. (Cl. 104—94)

This invention relates to suspension railways where the cars are suspended from elevated tracks, and more particularly to the supporting structure for such tracks.

Railways of the type here involved are disclosed, for instance, in Patent Nos. 2,825,291 and 3,059,591. Said patents are essentially concerned with the construction of the box section girders providing the tracks and with the means to prevent harmful effects of oscillations of the car bodies on the track system.

It is a principal object of this invention to provide supports for said box section girders which are readily and economically manufactured and erected and which permit of adapting the trackways to the obtaining inclination and gradients.

Other objects and advantages will be apparent from a consideration of the specification and claims.

The supports of columns of the invention consist essentially of three parts: The head, shaft, and foundation.

The head is made of reinforced concrete and forms two brackets carrying the tubular girder providing the trackways. The head is carried by a metal shaft of any desired cross section, and said shaft is supported on a supporting plate adapted to the conditions of the ground.

Head and shaft can be made separately by mass production methods and assembled at the place of construction.

The shaft is mounted on a bedplate resting on the ground foundation or on special foundation such as piles, whereby a cavity in the shape of a truncated cone is provided as a seat for the shaft in the foundation. Such foundation allows of correcting assembly errors and to adjust the vertical position of the shaft.

The tubular box section girders are either supported on, or suspended from, the brackets of the head of the column. Means are provided to adapt the positioning of the girders to the inclination, grade, or obliqueness required by the alignment of the tracks.

The grade or obliqueness of the track can be ensured by mounting the head of the column perpendicularly on the shaft while providing the brackets with adjustable oblique or inclined supporting means for the girders. In another embodiment of the invention, means are provided to secure the head of the column to the shaft in any desired inclined position, for instance by means of a kind of universal joint between shaft and head which, after proper adjustment, is frozen in the desired position.

The invention will now be described in more detail with reference to the accompanying drawings wherein FIG. 1 is a diagrammatic side view of a suspended railway of the type here involved;

FIG. 2 is a plan view corresponding to FIG. 1;

FIG. 3 is a view of a column according to the invention showing the tubular girder which provides the trackways for the cars of the suspended railway;

FIG. 4 is a longitudinal elevational view of the column of FIG. 3;

FIG. 5 is a sectional view taken along lines V—V of FIG. 3;

FIG. 8 shows diagrammatically the placing of the box-section girders on the columns;

FIG. 9 is a view of another embodiment of the invention showing suspension of the girders at the head of the column;

FIG. 10 is a side view corresponding to FIG. 9;

FIG. 11 is, in part, a sectional view showing the mounting of the head to the shaft of the column;

Figure 6:
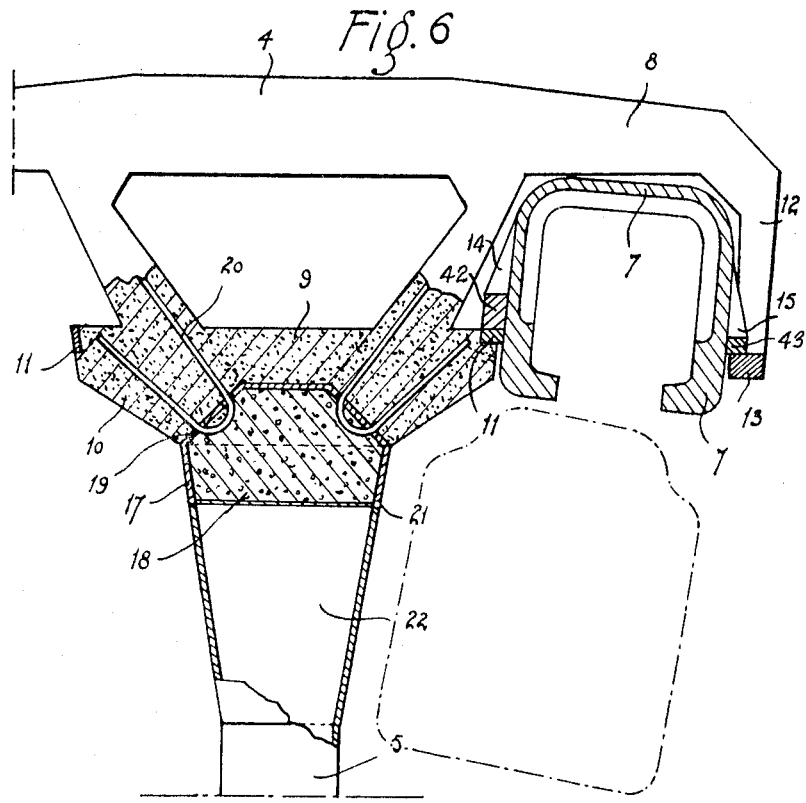
FIG. 6 shows, on a larger scale, the head of the column and its juncture to the shaft of the column.
Figure 7:
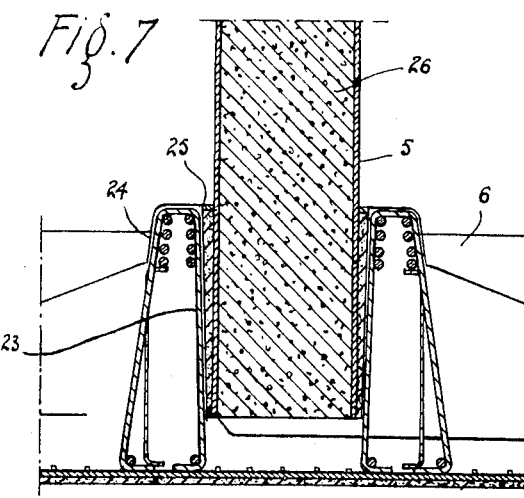
FIG. 7 is an elevational view of the base of the column and its foundation.

Though it will be understood that our invention can be applied to all systems using overhead tracks, we have selected for illustration herein a suspended railway of the type described in Patent Nos. 2,825,291 and 3,059,591 wherein cars 1 are suspended from two parallel elevated tracks 2 and 3. The tracks are provided within tubular girders having a longitudinally extending slot along the bottom thereof to allow passage of the suspension means for the cars. The girders contain also the lines for the current for the motors, signals, etc. and are made of metal, renforced concrete, or preferably of prestressed concrete as disclosed in application Ser. No. 303,531, filed August 21, 1963 by one of us.

The trackways 2 and 3 are carried by a head 4 with double brackets 8 mounted on posts 5 which are supported on base supporting means 6 whereby the assembly of 4, 5, 6, 8 constitutes the trackway supporting columns. The tracks 2 and 3 are formed by sectional girders 7 the ends of which are carried in the brackets 8. In accordance with the line followed by the railway, the tracks may be straight, curved horizontal or inclined, and the supports must be adapted to the corresponding curvatures or grades.

Each column consists of three main parts which are manufactured separately and assembled on site. In the embodiments of the invention shown, the head 4 with the brackets 8 is made of reinforced concrete, while the shaft 5 consists preferably of welded steel plates and is set in a reinforced cement foundation 6.

In the embodiment of the invention shown in FIGS. 3 to 6, the center portion 9 of the head 4 has two lateral projections 10 whose tips are reinforced by metal pieces 11. The outer arms 12 of each bracket 8 end also in metal pieces 13, and the pieces 11 and 13 cooperate to carry the tubular girders 7 by means of corresponding metal noses 14 and 15 securely attached to the girders. Adjoining box sections 7 of the girder are connected in each bracket by joints 16, and the noses 14, 15 at the ends of the girders are of about the same width as the brackets.

The supporting metal pieces 11 and 13 are arranged either in the same horizontal plane, or they may be arranged in different planes so as to impart to the girder the tilt or inclination required for the trackway. The exact position of the girder is readily obtained by means of wedges 42 and 43 of suitable form and thickness placed on the pieces 11 and 13 before the noses 14 and 15 are placed thereon.

The reinforced concrete head 4 may have a metal base plate 17 for welding connection at 21 to metal shaft 5. Such a member 17, e.g. of cast steel, can be incorporated in the head 4 during its manufacture. At 18, it receives a filling of concrete. It contains holes for the passage of steel bars 20 which are hooked or looped in the concrete filling 18 and constitute reinforcements for the head 4.

Shaft 5 may be a rectangular metal tube, which in the embodiment shown in FIGS. 3 to 6, flares in the upper portion 22 to provide an extended base for connection with the head 4. The small side of the rectangular shaft is preferably arranged in transverse direction to the tracks to allow maximum utilization of the available space between the two tracks.

The base of the shaft 5 is set in a cavity having the form of a truncated cone provided in a bedplate 6 of reinforced concrete. The seat of the shaft in the cavity is defined by suitable iron frames 23 which are strengthened by reinforcements 24, whereby the space 25 between the shaft 5 and the frames 23 is filled up, for instance, with concrete after the shaft has been correctly positioned. It will be seen that the provision of the conical seat makes it possible to secure the shaft in any desired inclined position.

It is of advantage to fill also at least the lower part 26 of the hollow shaft 5 with concrete so as to impart to the structure increased strength and resistance to impacts due to the vehicular traffic on the ground. As far as the shaft is not filled with concrete, its inside corrosion is prevented by a suitable lining.

The track-supporting columns can be assembled by first erecting and securing the shaft and then mounting the head 4 on the shaft 5 and secure it thereto by the weld 21. However, we prefer to assemble the entire column before it is put into place, by joining the shaft 5 to the head 4. Any required adjustments of the trackways may be made later by placing suitable wedges on the supporting metal edges 11 and 13.

The tubular girder sections are mounted on the erected columns by first placing a section between two columns adjoining an already assembled section and shifting the new section in direction of arrow F into position 7b (FIG. 8). The section is then raised in the direction of arrow G into position 7c, and finally slightly shifted in direction of arrow H so as to place the noses 14, 15 on the supporting members 11, 13 of the head 4. Thus, the girders are mounted by two simple and easy orthogonal translational motions.

According to another embodiment of the invention, the head 4 can be mounted on shaft 5 by a joint 27 which allows of giving the head a predetermined inclination or tilt corresponding to the alignment of the track. In this case, the sections 7 of the tubular girder may be permanently secured in the brackets 8 of the head 4, for instance, by suspending means 28.

The joint 27 comprises a spherical ring 29 of cast steel of the like attached to the upper end of the shaft 5 which has here a circular cross section. A corresponding spherical metal ring 31 of cast steel is attached to the base of head 4, forming with ring 29 a ball and swivel joint. In this way, the head 4 can be given any desired tilt or inclination in longitudinal or transverse direction to produce the required inclination of the tracks. When this inclination is accomplished, the two rings 29 and 31 are welded at 32 to fix the head 4 in this adjusted position. In order to increase the strength of the weld, the length of the welding seam 32 is extended by giving the upper edge of the ring 29 a notched or wavy shape. The spherical ring 31 of the base 30 of the head 4 can also serve as anchoring block for reinforcements 33 of the head 4. For this purpose, the reinforcements 33 may be passed through holes 34 bored as required or already provided for in the casting operation whereupon the ends of the reinforcing bars are upset to form rivet heads 35.

Figure 12:
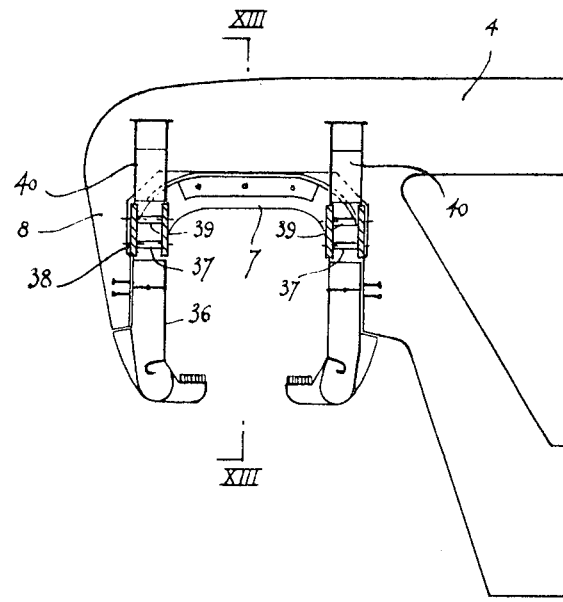
FIG. 12 is a transverse sectional view showing another embodiment of assemblage of the tubular girders to the columns.
Figure 13:
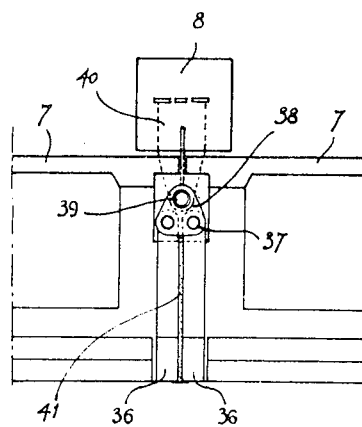
FIG. 13 is a longitudinal sectional view taken on line XIII—XIII of FIG. 12.

In the embodiment of the invention shown in FIGS. 12 and 13, the ends of contiguous box girder sections 7 are suspended at the brackets 4 of the column heads 4 as follows: Each end of the girder sections is partially surrounded by a metal collar 36 whose upper ends are connected by a shaft 37; the shafts 37 of contiguous girder sections 7 are inserted in the same metal plates 38 which, in turn, are suspended on shafts 39 which are disposed in metal boxes or other suitable suspending means firmly secured in the concrete of the head 4. The two adjoining sections may further be suitably connected at joints 41, for instance, by prestressed cables in combination with stiffeners as described more in detail in application Ser. No. 303,531, referred to hereinabove.

We claim:

1. A column suitable for supporting the elevated tracks of suspension railways, said column comprising essentially as separately manufactured units a head of reinforced concrete having at least one bracket for carrying the trackways, an at least partially hollow metallic vertical shaft supporting said head, and a bedplate carrying said shaft, and means provided at least at one of said units imparting to said trackways a predetermined position with respect to the horizontal plane.

2. A column as claimed in claim 1 wherein said head and said shaft are connected by a universal joint welded together in a predetermined position.

3. A column as claimed in claim 2 where said universal joint is a ball and socket joint, the ball being formed by the base of said head of the column and the socket being formed by the top of said shaft.

4. A column as claimed in claim 3 where the outer upper edge of said socket welded to the base of the head has a wavy contour.

5. A column as claimed in claim 3 comprising holes in the bottom of the ball portion of the head forming said joint and reinforcing bars inside the concrete of said head passing through said holes, the ends of said bars being broadened so as to anchor said bars in said bottom.

6. A column as claimed in claim 1 comprising in said bedplate a truncated conical seat for said shaft, the shaft being cemented in said seat at a predetermined angle.

7. A column as claimed in claim 6 comprising a filling of concrete in the bottom portion of said shaft.

8. A supporting structure for the cars of a suspension railway comprising columns as claimed in claim 1 and tubular section girders providing the trackways carried by said bracket.

9. A supporting structure as claimed in claim 8 comprising lateral projections at the ends of said section girders and metallic platforms at the lower ends of both sides of said bracket forming seats for said projections.

10. A supporting structure as claimed in claim 9 comprising wedges placed between said platforms and projections.

11. A supporting structure as claimed in claim 8 comprising suspending means secured in the concrete of the upper bar of said bracket, collar means at the ends of said section girders, and means securing said collar means to said suspending means.

12. A supporting structure as claimed in claim 11 wherein said securing means includes a plate connecting the ends of two contiguous section girders.

No references cited.

ARTHUR L. LA POINT, *Primary Examiner.*

MILTON BUCHLER, *Examiner.*